(12) United States Patent
Swinderman et al.

(10) Patent No.: US 6,966,430 B2
(45) Date of Patent: Nov. 22, 2005

(54) AIR SUPPORTED CONVEYOR WITH MULTIPRESSURE PLENUM SYSTEM

(75) Inventors: R. Todd Swinderman, Kewanee, IL (US); Gary D. Swearingen, Kewanee, IL (US); James A. Hicks, Big Stone, SD (US); Paul Grisley, Denver, CO (US)

(73) Assignee: Martin Engineering Company, Neponset, IL (US)

( * ) Notice: Subject to any disclaimer, the term of this patent is extended or adjusted under 35 U.S.C. 154(b) by 0 days.

(21) Appl. No.: 10/672,856

(22) Filed: Sep. 26, 2003

(65) Prior Publication Data

US 2004/0118661 A1 Jun. 24, 2004

Related U.S. Application Data

(60) Provisional application No. 60/413,718, filed on Sep. 26, 2002.

(51) Int. Cl.[7] .............................................. B65G 15/60
(52) U.S. Cl. ...................................................... 198/811
(58) Field of Search ........................................ 198/811

(56) References Cited

U.S. PATENT DOCUMENTS

| | | | | |
|---|---|---|---|---|
| 3,734,271 A | * | 5/1973 | Dolgolenko et al. | 198/811 |
| 4,316,718 A | * | 2/1982 | Drugge | 432/58 |
| 5,396,071 A | * | 3/1995 | Atwell et al. | 250/358.1 |
| 5,645,157 A | * | 7/1997 | Kitano et al. | 198/811 |
| 5,829,577 A | * | 11/1998 | Grisley | 198/811 |

* cited by examiner

Primary Examiner—Joe Dillon, Jr.
(74) Attorney, Agent, or Firm—Barnes & Thornburg LLP

(57) ABSTRACT

A multipressure plenum system for supporting a conveyor belt of a gas supported belt conveyor and method of operation. The multipressure plenum system includes a multipressure plenum having a support surface including a plurality of apertures and a chamber in fluid communication with the apertures. The chamber of the plenum is in selective fluid communication with a first source of gas at a first pressure, and is in selective fluid communication with a second source of gas at a second pressure. Gas from the first source of gas at the first pressure flows through the apertures in the plenum to form a gas cushion which supports the conveyor belt above the plenum. Gas from the second source of gas at the second pressure selectively flows through the apertures in the plenum to provide additional support to the conveyor belt.

16 Claims, 3 Drawing Sheets

AIR SUPPORTED CONVEYOR WITH MULTIPRESSURE PLENUM SYSTEM

RELATED APPLICATIONS

This application claims the benefit of U.S. Provisional Application No. 60/413,718, filed Sep. 26, 2002.

BACKGROUND OF THE INVENTION

The present invention is directed to an air supported belt conveyor, and in particular to an air supported belt conveyor having a conveyor belt and a multipressure plenum system including a multipressure plenum and a multipressure air supply system adapted to provide low pressure air or high pressure air as needed to the multipressure plenum to support the conveyor belt above the multipressure plenum.

Air supported belt conveyors are subject to overloading in the impact zone of the conveyor where the conveyed material is loaded onto the conveyor belt. The overloading of conveyed material can be due to surge loading, the use of a conveyor chute as a hopper, or from various conveyor and conveyor chute designs or operating methods that result in a greater load being placed on the conveyor belt than the design capacity of the belt. The overload of conveyed material can be intermittent or constant, and can vary greatly in magnitude. Air supported conveyors are capable of handling varying loads of conveyed material, but normally the low pressure air supply system and the plenum which receives the low pressure air are designed for the design capacity of the belt. Designing the plenum and air supply system for worst case material overload situations results in an over design that is energy inefficient, that can create unnecessarily high volumes of air being passed through the plenum which generates dust, and that can create unnecessarily high air pressures that may cause an unloaded conveyor belt to be unstable.

While air supported conveyors can handle an occasional overload of conveyed material, the inability of air supported conveyors to handle overloads has limited them to applications with fairly consistent loading conditions. When an air supported conveyor is loaded beyond the capacity of the conveyor to maintain a cushion or film of air between the plenum and the conveyor belt, the belt comes into contact with the plenum and frictional forces opposing movement of the belt increase dramatically. The increase in frictional forces causes the drive system of the conveyor to draw more power, and may cause the motor overload protection to stop the conveyor. This creates a situation where the operator of the conveyor must resolve the overload problem, usually by manually digging out conveyed material from the impact zone of the conveyor and then restarting the conveyor.

Overload conditions occur with conventional idler roller conveyors, but idler roller conveyors are more tolerant of overloads than air supported conveyors because the additional load that is placed on the roller bearings in an idler roller conveyor does not result in a dramatic increase in the frictional forces that oppose movement of the belt. Both conventional idler roller conveyors and air supported conveyors have difficulty overcoming the internal shearing force of the conveyed bulk material and the friction of the bulk material with the conveyor chute and skirt walls of the conveyor, when the conveyor feed system becomes plugged. Plugged conveyor chutes are one of the common situations that result in an overload in the impact zone of a conveyor. Other common causes include mistakes in operation of the conveyor, such as increasing the flow rate of conveyed material above the flow capacity of the conveyor, or conveying a type of bulk material on the conveyor that is outside of the material specifications for which the conveyor was designed. The conveyor chute may also become plugged by foreign material or tramp iron becoming wedged in the conveyor chute or impact zone of the conveyor. Controls have been designed to prevent plugging of conveyor chutes and impact zones, such as chute level indicators and flow rate indicators. However, these indicator controls are often inoperative. The multipressure plenum system disclosed herein enables an air supported conveyor to switch from a low pressure air supply to a high pressure air supply in the impact zone plenum when a material overload situation is sensed or predicted to thereby enable the conveyor to continue running efficiently.

SUMMARY OF THE INVENTION

A multipressure plenum system for supporting a conveyor belt of a gas supported belt conveyor. The multipressure plenum system includes a multipressure plenum having a support surface including a plurality of apertures and a chamber in fluid communication with the apertures. A first source of gas at a first pressure is in fluid communication with the chamber of the multipressure plenum through a first conduit. A second source of gas at a second pressure is in fluid communication with the chamber of the plenum through a second conduit.

The first source of gas is adapted to selectively supply gas, such as air, at the first pressure to the chamber of the plenum such that the gas flows through the apertures in the support surface to form a gas cushion between the conveyor belt and the support surface of the plenum. The second source of gas at the second pressure is adapted to selectively supply gas, such as air, at the second pressure to the chamber of the plenum such that the gas at the second pressure flows through the apertures in the support surface and forms the gas cushion that supports the conveyor belt. The pressure of the gas at the second pressure is greater than the pressure of the gas at the first pressure. The gas cushion provided by the second source of gas is adapted to support more weight than the gas cushion provided by the first source of gas. The flow of gas at the first pressure to the plenum is stopped, and the flow of gas at the second pressure is provided to the plenum, when the gas cushion is required to provide additional support to the conveyor belt.

BRIEF DESCRIPTION OF THE DRAWING FIGURES

DETAILED DESCRIPTION OF THE PREFERRED EMBODIMENTS

Figure 1:
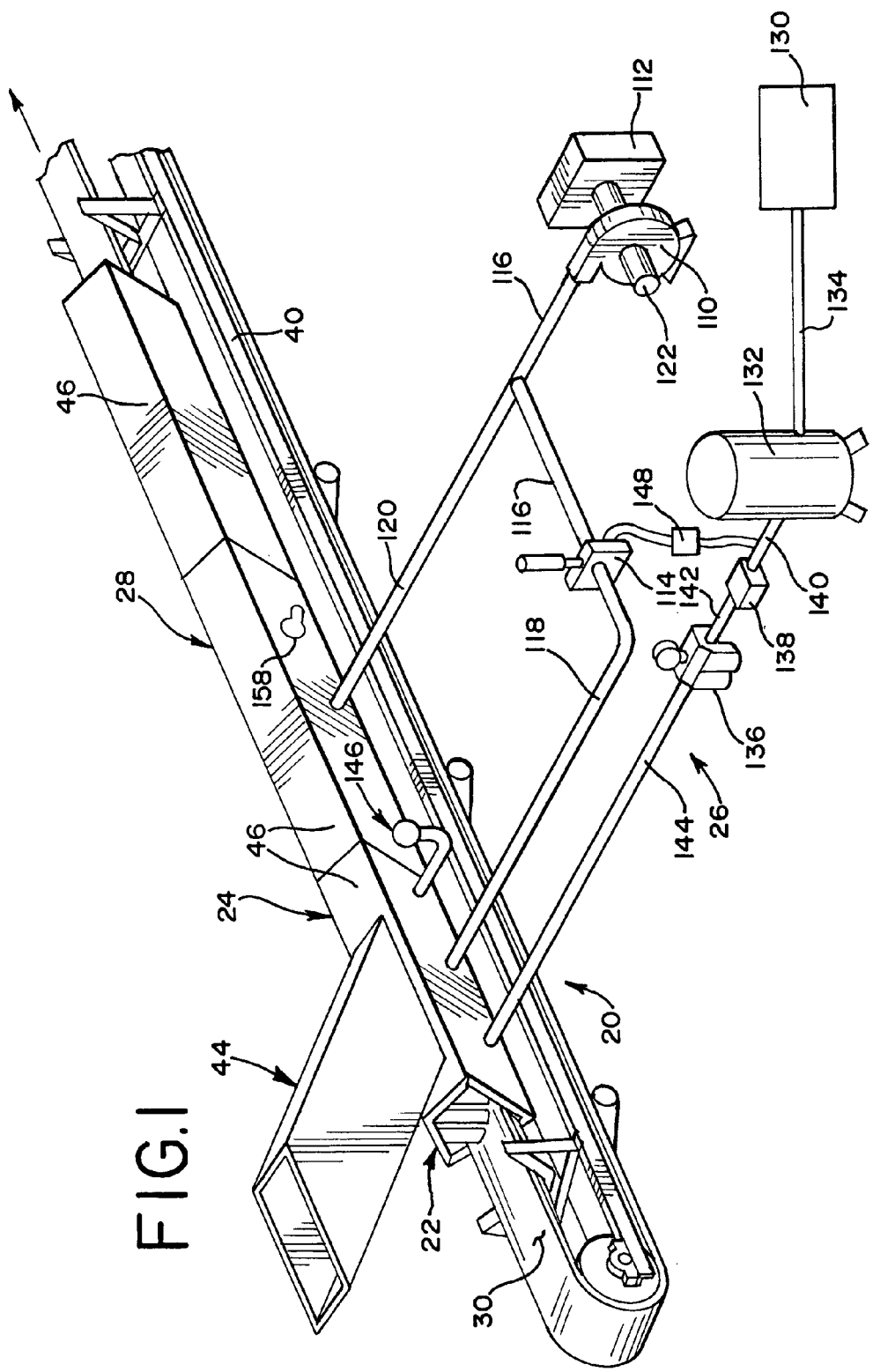
FIG. 1 is a diagrammatic view of an air supported belt conveyor having the multipressure plenum system of the present invention.
Figure 2:
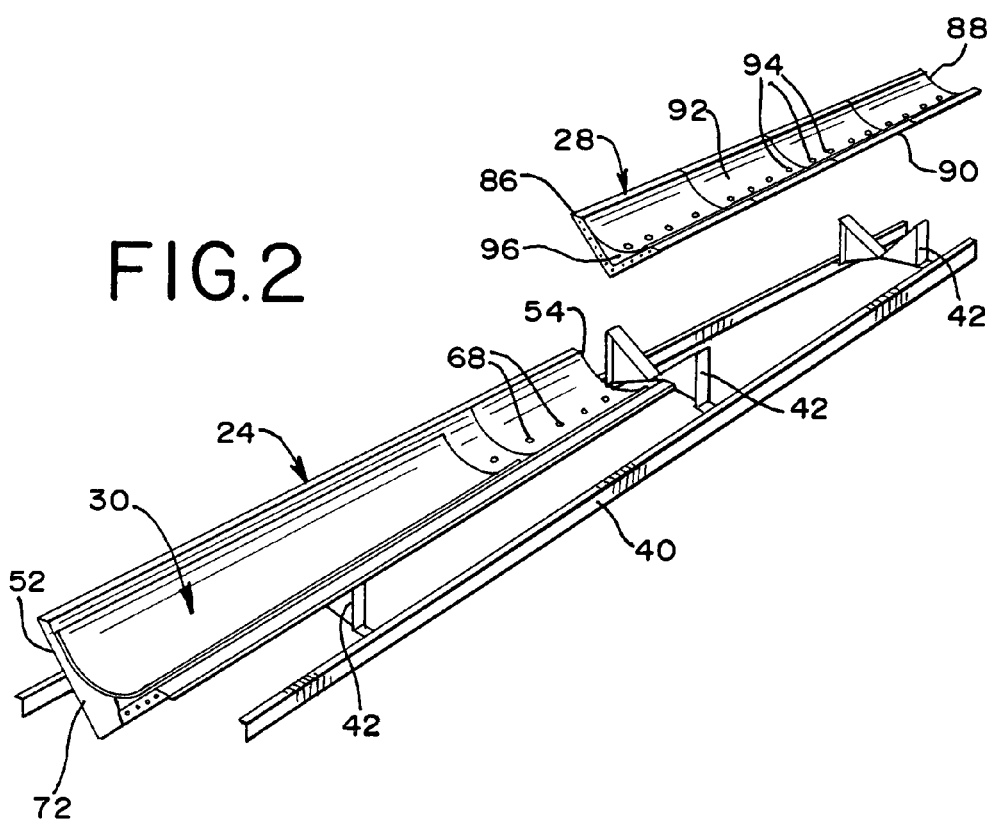
FIG. 2 is a partial exploded view of an air supported belt conveyor including a multipressure plenum and a low pressure plenum.
Figure 3:
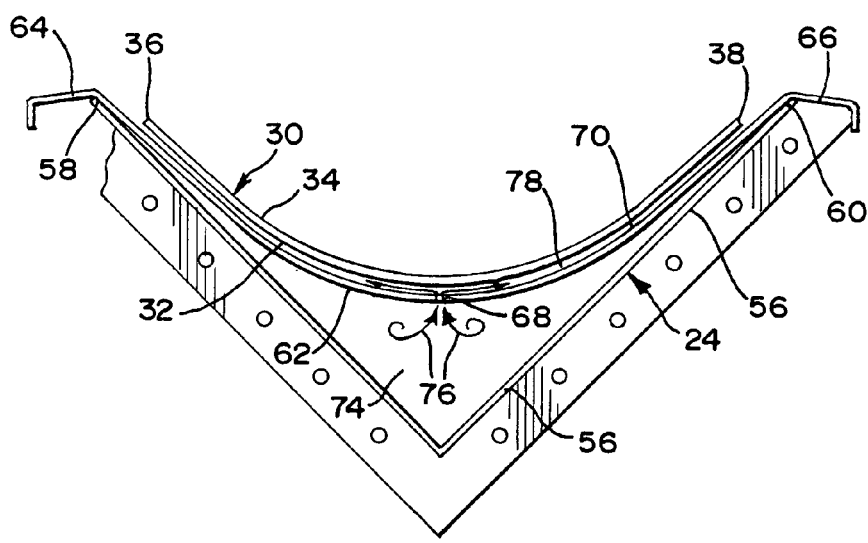
FIG. 3 is a partial cross sectional view of the multipressure plenum.

The multipressure plenum system 20 of an air supported belt conveyor 22 is shown in FIG. 1. The multipressure plenum system 20 includes one or more multipressure plenums 24, a multipressure air supply system 26, and one or more low pressure plenums 28. As best shown in FIG. 3, the air supported belt conveyor 22 includes a conveyor belt 30 having an inner surface 32 adapted to be located adjacent to the plenums 24 and 28 and an outer surface 34 adapted to carry the conveyed bulk material. The conveyor belt 30 includes a generally linear first edge 36 and a parallel generally linear second edge 38. As best shown in FIG. 2, the conveyor 22 also includes a support frame 40 having a plurality of support brackets 42. The support brackets 42 are adapted to support the plenums 24 and 28 on the frame 40. The conveyor 22 also includes a plurality of return rollers which are adapted to support the lower return run of the conveyor belt 30. The return rollers may be attached to the support frame 40. As shown in FIG. 1, a conveyor chute 44 is adapted to load bulk material, such as sand, gravel, coal, grain or the like, on the outer surface 34 of the conveyor belt 30 in the impact zone of the conveyor 22. The conveyor 22 includes one or more dust containment housings 46 as shown in FIG. 1. The housings 46 form a tunnel in connection with the plenums 24 and 28 through which the conveyor belt 30 and the conveyed bulk material pass.

The multipressure plenum 24 and the low pressure plenums 28 are constructed in the same general manner as the plenums described and disclosed in U.S. Pat. No. 5,829,577, which is incorporated herein by reference. As best shown in FIG. 2, the multipressure plenum 24 extends from a first end 52 to a second end 54. As shown in FIG. 3, the multipressure plenum 24 includes a generally V-shaped bottom member 56 having a generally linear first edge 58 and a spaced apart and parallel generally linear second edge 60. The bottom member 56 extends between the first end 52 and the second end 54 of the multipressure plenum 24. The multipressure plenum 24 also includes a generally concavely curved upper support member 62 having a first edge 64 and a spaced apart and generally parallel second edge 66. The first edge 64 of the upper member 62 is attached to the first edge 58 of the bottom member 56 and the second edge 66 of the upper member 62 is attached to the second edge 60 of the bottom member 56. The upper member 62 extends between the first end 52 and second end 54 of the multipressure plenum 24. The upper member 62 may be formed in the shape of a parabola, arc, catenary or other similar curve or concave shape. The upper member 62 includes a plurality of apertures 68. The apertures 68 are spaced generally uniformly apart from one another in a generally linear line located midway between the first edge 64 and second edge 66 of the upper member 62. The line of apertures 68 extends from the first end 52 to the second end 54 of the multipressure plenum 24. The upper member 62 also includes an outer surface 70. The multipressure plenum 24 includes an end cap 72 at the first end 52 and also at the second end 54 which is connected to the bottom member 56 and the upper member 62. The multipressure plenum 24 includes an enclosed hollow chamber 74 located between the bottom member 56, upper member 62 and the end caps 72 which is adapted to receive a supply of low pressure or high pressure air 76 or other type of gas.

As shown in FIG. 3, the conveyor belt 30 is adapted to be located above and spaced apart from the outer surface 70 of the upper member 62 such that there is a gap between the inner surface 32 of the conveyor belt 30 and the outer surface 70 of the upper member 62 formed by an air cushion 78. The air cushion 78 supports the conveyor belt 30 and the conveyed material above the upper member 62 of the multipressure plenum 24 to avoid contact between the conveyor belt 30 and the outer surface 70 of the upper member 62 of the multipressure plenum 24.

As best shown in FIG. 2, the low pressure plenum 28 extends between a first end 86 and a second end 88. The low pressure plenum 28 is constructed in the same general manner as the multipressure plenum 24. The low pressure plenum 28 includes a generally V-shaped bottom member 90 and a generally concavely curved upper member 92 that is connected to the bottom member 90. The upper member 92 includes a generally linear line of uniformly spaced apart apertures 94. A chamber 96 is formed between the bottom member 90 and upper member 92 which is adapted to receive a supply of low pressure air. The first end 86 of the low pressure plenum 28 which is located adjacent the second end 54 of the multipressure plenum 24 includes an end cap attached to the bottom member 90 and upper member 92. The chamber 96 of the low pressure plenum 28 is not in direct fluid communication with the chamber 74 of the multipressure plenum 24. The first end 86 of the low pressure plenum 28 is adapted to be placed adjacent the second end 54 of the multipressure plenum 24 such that the upper member 92 is aligned with the upper member 62 and such the line of apertures 94 is aligned with the line of apertures 68. The second end 88 of the low pressure plenum 28 may be enclosed with an end cap or may be connected to a second low pressure plenum 28 such that the chambers 96 of the adjacent low pressure plenums 28 are in direct fluid communication with one another.

The multipressure air supply system 26 of the multipressure plenum system 20 includes a source of low pressure air such as a fan blower 110. An air filter 112 is in fluid communication with the inlet of the fan blower 110. The air supply system 26 also includes a blast gate valve 114, or a one-way flap valve or similar device to prevent back flow of air. An inlet of the blast gate valve 114 is in fluid communication with an outlet of the fan blower 10 through a conduit 116. A conduit 118 provides fluid communication between an outlet of the blast gate valve 114 and the chamber 74 of the multipressure plenum 24. The valve 114 is adapted to prevent the back flow of air from the conduit 118 into the conduit 116. A conduit 120 provides fluid communication in fluid communication between the outlet of the fan blower 110 and the chambers 96 of the low pressure plenums 28. The conduit 120 may be connected between the conduit 116 and the chamber 96. The fan blower 110 is operated by an electrical motor 122. The fan blower 110 preferably provides a supply of low pressure air through the conduits 116 and 120 to the chambers 96 of the low pressure plenums 28, and when the blast gate valve 114 is in the open position a supply of low pressure air through the conduits 116 and 118 to the chamber 74 of the multipressure plenum 24. The fan blower 110 preferably provides an output of low pressure air having a pressure in the range of approximately ten to forty inches of water column static gauge pressure (wcg). The flow rate of low pressure air that is provided depends upon the length of the conveyor, but is typically in the range of two to three cubic feet per minute (cfm) per lineal foot of conveyor belt length that is to be supported by the air.

The air supply system 26 also includes a source of high pressure air, such as an air compressor 130. The air supply system 26 may include an air accumulator or receiver 132, in the form of a tank having a chamber, which is in fluid communication with the air compressor 130 through a conduit 134. The accumulator 132 is adapted to receive and store a volume of high pressure air supplied by the air compressor 130. The air supply system 26 also includes an air pressure regulator 136 and a control valve 138. The control valve 138 is preferably a solenoid control valve, but may be a manually operated control valve if desired. A conduit 140 provides fluid communication between the accumulator 132 and an inlet of the control valve 138. A conduit 142 provides fluid communication between an outlet of the control valve 138 and an inlet of the pressure regulator 136. A conduit 144 provides fluid communication between an outlet of the pressure regulator 136 and the chamber 74 of the multipressure plenum 24.

When the control valve 138 is in the open position, compressed high pressure air flows from the accumulator 132 to the control valve 138 through the conduit 140, and through the control valve 138 and the conduit 142 to the pressure regulator 136. The pressure regulator 136 may be selectively adjusted to provide high pressure air to the chamber 74 of the multipressure plenum 24 through the conduit 144 at a desired pressure. The high pressure air is preferably provided to the chamber 74 of the multipressure plenum 24 at a pressure in the range of approximately thirty to one-hundred twenty inches of water column static gauge pressure (wcg) and at a flow rate in the range of ten to thirty cubic feet per minute (cfm) per lineal foot of conveyor belt that is to be supported by the air. A pressure relief valve 146 is in fluid communication with the chamber 74 of the multipressure plenum 24. The pressure relief valve 146 is adapted to release air from the chamber 74 if the pressure within the chamber 74 exceeds a predetermined maximum value to eliminate excess pressure which may otherwise damage the plenum 24.

Figure 4:
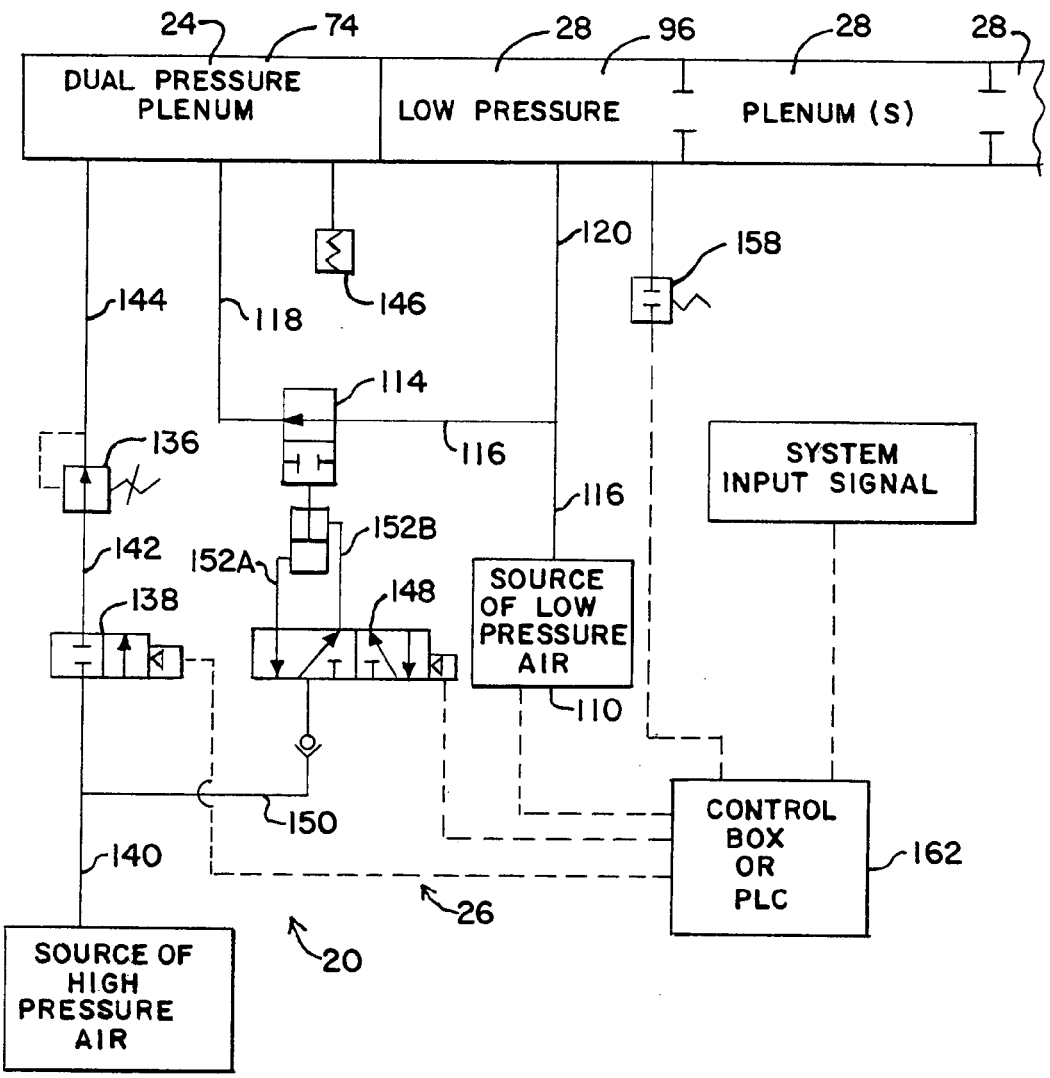
FIG. 4 is a schematic diagram of the multipressure plenum system.

As best shown in FIG. 4, the air supply system 26 also includes a control valve 148 which is placed in fluid communication with the accumulator 132 through a conduit 150. The conduit 150 may be connected in fluid communication between the conduit 140 and the control valve 148. The control valve 148 is placed in fluid communication with the blast gate valve 114 by conduits 152A-B. The control valve 148 is preferable a solenoid valve. When the control valve 148 is located in a first position, as shown in FIG. 4, the control valve 148 allows high pressure air to flow from the conduit 150 and through the conduit 152B to a first chamber of a pneumatic cylinder of the blast gate valve 114 having a piston which moves the blast gate valve 114 to an open position. When the blast gate valve 114 is in the open position, the valve 114 allows low pressure air to flow from the conduit 116 into the conduit 118 and thereby into the chamber 74 of the multipressure plenum 24. When the control valve 148 is moved to a second position it allows high pressure air to flow from the conduit 150 and through the conduit 152A into a second chamber of the pneumatic cylinder of the blast gate valve 114 which moves the valve 114 to a closed position. When the blast gate valve 114 is in the closed position, the valve 114 prevents the flow of air between the conduits 116 and 118.

The air compressor 130 and the accumulator 132 may alternatively be the source of low pressure air that is supplied to the chamber 74 of the multipressure plenum 24 and to the chambers 96 of the low pressure plenums 28, rather than the blower 110, by connecting the conduit 116 to the accumulator 132 through a pressure regulator and valve. The pressure regulator receives high pressure air from the accumulator and provides low pressure air to the conduit 116 for distribution to the multipressure plenum 24 and the low pressure plenums 28.

The air supply system 26 also includes a low pressure switch 158 in fluid communication with the chambers 96 of the low pressure plenums 28. The low pressure switch 158 is adapted to sense when the air pressure within the chambers 96 of the low pressure plenums 28 is lower than a desired preselected pressure and to transmit an electrical output signal when such a low pressure condition is sensed to shut down operation of the conveyor belt.

The air supply system 26 also includes an electrical controller 162. The controller 162, illustrated in FIG. 4, may include electromechanical relays or a programmable logic controller (PLC). The controller 162 is in electrical communication with the motor 122 that operates the fan blower 110, the control valve 138, the control valve 148, and the low pressure switch 158. During normal operation of the air supported belt conveyor 22, the controller 162 closes the control valve 138 thereby preventing high pressure air in the accumulator 132 from flowing into the chamber 74 of the multipressure plenum 24. The controller 162 will also move the control valve 148 to the first position as shown in FIG. 4 to open the blast gate valve 114. The blast gate valve 114 thereby allows low pressure air from the fan blower 110 to flow through the conduits 116 and 118 into the chamber 74 of the multipressure plenum 24. The chamber 74 of the multipressure plenum 24 is thereby charged with low pressure air which flows through the apertures 68 of the upper member 62 to provide the air cushion 78 between the upper member 62 of the multipressure plenum 24 and the inner surface 32 of the conveyor belt 30. The air cushion 78 supports the conveyor belt 30 and conveyed material in the impact zone above and spaced apart from the outer surface 70 of the upper member 62. Low pressure air is also provided by the fan blower 110 through the conduits 116 and 120 to the chambers 96 of the low pressure plenums 28. The low pressure air within the chambers 28 flows through the apertures 94 in the upper member 92 of the low pressure plenums 28 to support the conveyor belt 30 and conveyed material on an air cushion above and spaced apart from the upper member 92.

In an overload operating condition, an electrical input signal indicating an overload condition is sent to the controller 162. The controller 162 opens the control valve 138 such that high pressure air flows from the accumulator 132 through the control valve 138 to the pressure regulator 136. The pressure regulator 136 allows high pressure air at a desired pressure to flow through the conduit 144 into the chamber 74 of the multipressure plenum 24. The controller 162 also moves the control valve 148 to the second position to thereby close the blast gate valve 114 to prevent fluid communication between the conduits 116 and 118. The chamber 74 of the multipressure plenum 24 thereby becomes charged with high pressure air and no longer receives low pressure air from the fan blower 110. The conduit 118 also becomes charged with high pressure air from the chamber 74 of the multipressure plenum 24. However, the closed blast gate valve 114 prevents the high pressure air in the conduit 118 from flowing into the conduit 116. If a flap valve is used in place of the blast gate valve 114, the flap valve operates like a valve on a bellows allowing air flow in one direction. The flap valve closes by gravity when the air pressure within the conduit 118 is greater than the air pressure within the conduit 116 to prevent air from flowing from the conduit 118 to the conduit 116. The higher pressure of the air within the conduit 118, as compared to the lower air pressure within the conduit 116, keeps the flap valve closed until the control valve 138 is closed and the air pressure in the conduit 118 decreases to allow the low pressure air within the conduit 116 to open the flap valve. The high pressure air within the chamber 74 of the multipressure plenum 24 flows through the apertures 68 in the upper member 62 forming the air cushion 78 which is adapted to maintain the conveyor belt 30 above and spaced apart from the outer surface 70 of the upper member 62 during an overload condition. The fan blower 110 will continue to supply low pressure air to the chambers 96 of the low pressure plenums 28 through the conduits 116 and 120.

An overload condition in the impact zone of the conveyor 22 can be detected in several ways. One way is to monitor the electrical current drawn by the motor which operates the conveyor belt 30. An increase in motor current indicates that heavier loads are being encountered by the moving conveyor belt 30. When the motor current reaches a predetermined value, a signal can be sent to the controller 162 indicating that an overload condition has been encountered whereupon the controller 162 will supply high pressure air to the chamber 74 of the multipressure plenum 24. When the motor current falls below a predetermined value a signal can be sent to the controller 162 whereupon low pressure air can then be provided to the chamber 74 of the multipressure plenum 24. Another way is to provide an electrical input signal to the controller 162 such as when a feed gate in the chute 44 is opened, or is opened beyond a predetermined position, indicating the need to supply high pressure air to the multipressure plenum 74. If the feed gate of the chute is closed, or closed beyond a predetermined position, an electrical signal can be sent to the controller 162 indicating that low pressure air only should be supplied to the multipressure plenum 74. A chute plug switch may also be used to send an electrical signal to the controller 162 to indicate whether low pressure air or high pressure air should be supplied to the multipressure plenum 74. The supply of low pressure air or high pressure air as needed to the multipressure plenum 24 can be initiated upon sensing any one or more of a number of operational activities that can cause an overload condition. The air supply system 26 can be left in the overload condition, wherein it supplies high pressure air to the multipressure plenum 24, for either a predetermined period of time or until the sensor that activated the overload condition indicates that the overload condition has been cleared.

Upon sensing an air pressure within the chambers 96 of the low pressure plenums 28 that is below a predetermined value, the low pressure switch 158 will send an electrical signal to the controller 162, and the controller 162 will stop operation of the conveyor belt 30 and the fan blower 110. The controller 162 will also move the control valve 138 to the closed position, such that neither low pressure air nor high pressure air is supplied to the plenums 24 and 28. Once the problem that caused the abnormally low pressure condition has been resolved, the conveyor belt 30 and air supply system 26 may then be reactivated. A low pressure switch may similarly be placed in fluid communication with the chamber 74 of the multipressure plenum 24 and electrically connected to the controller 162.

The multipressure air supply system 26 provides low pressure air to the chamber 74 of the multipressure plenum 24 when the conveyor 22 is operating under normal load conditions and automatically switches to provide high pressure air to the chamber 74 of the multipressure plenum 24 when the conveyor 22 encounters an overload condition. This automatic operation eliminates time consuming system shut downs and the need to manually unload the conveyed material from the conveyor belt 30 so that the conveyor can be restarted. All of the operations can be remotely monitored in a control room and manual overrides can be provided.

The multipressure plenum system 20 has been described herein as providing either low or high pressure air to a single multipressure plenum 24 by the multipressure air supply system 26. However, the multipressure plenum system 20 may include a plurality of multipressure plenums that are selectively placed in fluid communication with the fan blower 110 and the accumulator 132 as described herein such that each multipressure plenum may receive either low pressure air from the fan blower 10 or high pressure air from the accumulator 132. The respective pressure of the high pressure air that is provided to each multipressure plenum may be varied as desired from plenum to plenum by respective air pressure regulators. The high pressure air for the multipressure plenum 24 can be provided from a high pressure blower as an alternative to an air compressor.

Figure 5:
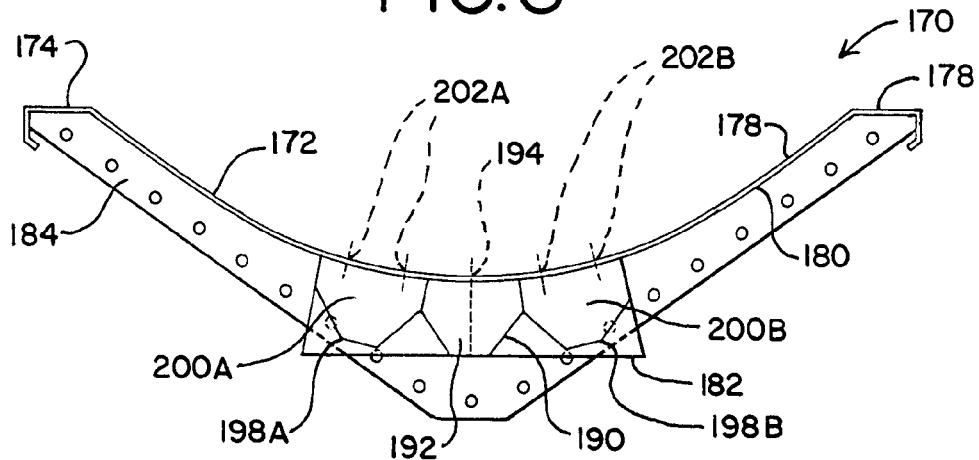
FIG. 5 is a an end view of a modified embodiment of the multipressure plenum.

A modified embodiment of the multipressure plenum is shown in FIG. 5 and is identified with the reference number 170. The multipressure plenum 170 includes a generally concavely curved upper support member 172 having a generally linear first edge 174 and a spaced apart and parallel generally linear second edge 176. The upper member 170 includes an outer surface 178 and an inner surface 180. A plurality of bracket members 182 are attached to the inner surface 180 of the upper support member 172 that are adapted to support the multipressure plenum 170 on the support frame 40. A flange 184 is provided at each end of the multipressure plenum 170. Each flange 184 is adapted to be connected to an adjacent flange of an adjacent plenum. The plenum 170 includes a center channel 190 attached to the inner surface 180 of the upper support member 172 that is located midway between the edges 174 and 176 and that extends the length of the plenum 170. The center channel 190 includes an enclosed chamber 192. The upper support member 172 includes a plurality of apertures 194 that extend through the upper support member 172 and that are in fluid communication with the chamber 192. The apertures 194 are uniformly spaced apart from one another in a generally linear line. The chamber 192 of the center channel 190 is adapted to be placed in fluid communication with the conduit 118 such that low pressure air from the fan blower 110 is supplied to the chamber 192.

The multipressure plenum 170 also includes a plurality of outer channels 198A and 198B that are located adjacent to and respectively on opposite sides of the center channel 190. The outer channels 198A–B extend the length of the multipressure plenum 170. The outer channel 198A includes an enclosed chamber 200A and the outer channel 198B includes an enclosed chamber 200B. The upper support member 172 includes a plurality of apertures 202A that extend through the upper support member 172 and that are in fluid communication with the chamber 200A. The apertures 202A are located in two generally parallel linear lines of uniformly spaced apart apertures. The upper support member 172 also includes a plurality of apertures 202B that extend through the upper support member 172 and that are in fluid communication with the chamber 200B. The apertures 202B are located in two generally parallel linear lines of uniformly spaced apart apertures. The chambers 200A–B of the outer channels 198A–B are adapted to be placed in fluid communication with the conduit 144 to receive high pressure air.

During normal conveyor operating conditions, low pressure air is supplied to the chamber 192 of the center channel 190 and high pressure air is not provided to the chambers 200A–B of the outer channels 198A–B. The low pressure air flows from the chamber 192 through the apertures 194 to support the conveyor belt 30 above the upper support member 172. During overload conditions, high pressure air is supplied to the chambers 200A–B of the outer channels 198A–B. The high pressure air flows from the chambers 200A–B through the apertures 202A–B to support the conveyor belt 30 above the upper support member 172.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. A multipressure plenum system for supporting a conveyor belt of a gas supported belt conveyor, said multipressure plenum system including:
    a plenum having a support surface including a plurality of apertures and a chamber in fluid communication with said apertures;
    a first conduit in fluid communication with said chamber of said plenum, said first conduit adapted to supply gas at a first pressure to said chamber;
    a second conduit in fluid communication with said chamber of said plenum, said second conduit adapted to supply gas at a second pressure to said chamber;
    whereby said first conduit is adapted to supply the gas at said first pressure to said chamber of said plenum such that the gas at said first pressure flows through said apertures to form a gas cushion between the conveyor belt and said support surface of said plenum, and said second conduit is adapted alternatively to supply the gas at said second pressure to said chamber of said plenum such that the gas at said second pressure flows through said apertures in said support surface to form the gas cushion.

2. The multipressure plenum system of claim 1 including a valve in fluid communication with said first conduit, said valve adapted to prevent the gas at said second pressure as supplied to said chamber of said plenum from flowing out of said first conduit.

3. The multipressure plenum system of claim 1 including a pressure regulator in fluid communication with said second conduit, said pressure regulator adapted to control the pressure at which the gas at said second pressure is supplied to said chamber of said plenum.

4. The multipressure plenum system of claim 1 including a valve in fluid communication with said second conduit, said valve adapted to control the flow of gas to said second conduit.

5. The multipressure plenum system of claim 4 including an accumulator in fluid communication with said second conduit, said accumulator adapted to contain gas at a pressure at least equal to said second pressure.

6. A multipressure plenum system for supporting a conveyor belt of a gas supported belt conveyor, said multipressure plenum system including:
    a plenum having a support surface including a plurality of apertures and a chamber in fluid communication with said apertures;
    a first source of gas at a first pressure, said first source of gas adapted to be placed in fluid communication with said chamber of said plenum;
    a second source of gas at a second pressure, said second source of gas adapted to be placed in fluid communication with said chamber of said plenum;
    whereby said first source of gas is adapted to supply gas at said first pressure to said chamber of said plenum such that the gas flows through said apertures in said support surface to form a gas cushion between the conveyor belt and said support surface of said plenum, and said second source of gas at said second pressure is adapted alternatively to supply gas at said second pressure to said chamber of said plenum such that said gas at said second pressure flows through said apertures in said support surface and forms the gas cushion that supports the conveyor belt, the gas cushion provided by said second source of gas adapted to support more weight than the gas cushion provided by said first source of gas.

7. The multipressure plenum system of claim 6 wherein said second pressure of the gas supplied by said second source of gas is greater than the pressure of the gas supplied by said first source of gas at said first pressure.

8. The multipressure plenum system of claim 6 wherein said first source of gas comprises a blower.

9. The multipressure plenum system of claim 6 wherein said second source of gas comprises an air compressor.

10. The multipressure plenum system of claim 6 wherein said second source of gas comprises an accumulator.

11. The multipressure plenum system of claim 6 including a valve providing selective fluid communication between said first source of gas and said chamber of said plenum.

12. The multipressure plenum system of claim 6 including a pressure regulator in fluid communication between said second source of gas and said chamber of said plenum, said pressure regulator adapted to control the pressure at which the gas at said second pressure is provided to said chamber of said plenum.

13. The multipressure plenum system of claim 6 including a valve providing selective fluid communication between said second source of gas and said chamber of said plenum.

14. The multipressure plenum system of claim 6 including a second plenum, said second plenum including a support surface having a plurality of apertures and a chamber in fluid communication with said apertures, said first source of gas being in fluid communication with said chamber of said second plenum.

15. The multipressure plenum system of claim 6 including a pressure relief valve adapted to vent gas within said chamber of said plenum to the atmosphere when the gas within said chamber reaches a selected pressure.

16. The multipressure plenum system of claim 6 including a pressure switch for sensing when the pressure of the gas within said chamber of said plenum falls below a selected pressure.

* * * * *